US005599594A

United States Patent [19]

Pauley

[11] Patent Number: 5,599,594

[45] Date of Patent: Feb. 4, 1997

[54] SIMULATED OBJECTS

[75] Inventor: Gerald R. Pauley, Victoria, Australia

[73] Assignee: Australian Gem Exchange Pty. Ltd., Braeside, Australia

[21] Appl. No.: 162,119

[22] PCT Filed: Jun. 12, 1992

[86] PCT No.: PCT/AU92/00277

§ 371 Date: May 4, 1994

§ 102(e) Date: May 4, 1994

[87] PCT Pub. No.: WO92/21633

PCT Pub. Date: Dec. 10, 1992

[30] Foreign Application Priority Data

| | | | |
|---|---|---|---|
| Jun. 13, 1991 | [AU] | Australia | PK6648 |
| Jul. 22, 1991 | [AU] | Australia | PK7338 |
| Dec. 10, 1991 | [AU] | Australia | 88930/91 |

[51] Int. Cl.$^{6}$ ....... B32B 9/00

[52] U.S. Cl. ....... 428/13; 428/15; 428/195; 428/542.2; 428/542.6; 428/543; 63/32

[58] Field of Search ....... 428/13, 76, 195, 428/542.2, 15, 542.6, 543; 63/32

[56] References Cited

U.S. PATENT DOCUMENTS 4,604,876 8/1986 Hoffmann ....... 63/32

FOREIGN PATENT DOCUMENTS

45209/72 2/1974 Australia .
23342/77 9/1978 Australia .
40462/85 10/1985 Australia .
81571/82 1/1986 Australia .
0287746 10/1988 European Pat. Off. .
615000 12/1948 United Kingdom .

OTHER PUBLICATIONS

Derwent WPi/L On Line Abstract Accession No. 88–193606, JP, A 63130399.
Derwent WPI/L On Line Abstract Accession No. 86–335053, JP, A 61249798.
Derwent WPI/L On Line Abstract Accession No. 77–11830y, JP, A, 51551751.
Derwent WPI/L On Line Abstract Accession No. 76–89601x, JP, A, 51116857.
Derwent WPI/L On Line Abstract Accession No. 77–11830Y, JP A, 51551751.
Derwent WPI/L On Line Abstract Accession No. 86–335053, JP, A 61249798.

*Primary Examiner*—Patrick Ryan
*Assistant Examiner*—Abraham Bahta
*Attorney, Agent, or Firm*—Jacobson, Price, Holman & Stern, PLLC

[57] ABSTRACT

The specification describes articles which have a three-dimensional appearance even though they comprise a two-dimensional representation of an object. The effect can be achieved by coating the two-dimensional representation with a protective coating of a clear resin of clear plastics material, having a convex external surface. The articles may be buttons or jewellery that have the appearance of being made from gem stones such as opal.

29 Claims, 2 Drawing Sheets

SIMULATED OBJECTS

The present invention relates to the production of articles comprising simulated objects especially in a form suitable for use as jewellery or decorative buttons.

The specification of Australian patent No. 465194 describes a method of setting gem chips in a base for subsequent use in articles of jewellery. The method comprised placing the gem chips in a prefabricated mould made from a black synthetic plastics material, filling the mould with a clear liquid resin and curing the resin to form an integral assembly comprising the mould, the gem chips and the thermoset resin. The resultant product enabled the production of items of jewellery considerably more cheaply than items produced from an actual gem. Nonetheless the cost of the chips of slices represented a substantial portion of the cost of producing the end product. In addition the cost of the end product increased with the quality of the gem stone from which slices or chips had been taken. Furthermore placing gem chips into the backing is labour intensive.

It has now been discovered that high quality reproductions can be produced using photographic and other reproductive techniques thereby substantially reducing the cost of the reproductions and permitting the reproduction of the finest gem stones.

Accordingly in a first aspect of the present invention there is provided an article comprising a two dimensional reproduction of a surface of an object and a protective coating of a clear resin or clear plastics material, the two dimensional reproduction being a photographic reproduction or a drawn simulation wherein the article is so formed that the reproduction has a three dimensional appearance. The three dimensional appearance may be achieved by forming the protecting coating with a convex external surface. Alternatively it may be achieved by interposing a layer of clear resin between a film bearing the two dimensional reproduction and a reflective backing.

The resin may be an epoxy resin or a polyester resin but an epoxy resin is preferred. The clear plastics material is preferably a poly(meth)acrylate.

In a second aspect, the invention provides a method of making an article which method comprises forming a two dimensional representation of a surface of an object, covering the two dimensional representation with a protective coating of a clear resin or clear plastics material and causing the protective coating to form an external surface that is so shaped that it causes the article to have the appearance of the object.

In a third aspect of the invention there is provided an article of a thermoplastics material, the article having an outer surface and an inner surface wherein the inner surface has a holographic grating applied thereto. In a further aspect of the invention there is provided a method of producing a holographic grating on a surface of an article made from a thermoplastics material which method comprises forming a shim having a holographic grating applied thereto, placing the shim in a mould used to form the article by injection moulding, injecting molten thermoplastics material into the mould, causing the thermoplastics material to set and removing the article from the mould.

The two dimensional representation may also be produced using computer graphics and then transferring the image so produced to a photocopier such as the Canon CLC 500. This method has been particularly useful in generating simulated opal patterns.

In a preferred form of the invention there is provided a simulated gem stone comprising:

a photographic reproduction of a gemstone on a suitable backing sheet;

a layer of clear protective film covering the reproduction; and a protective coating of a clear thermosetting resin covering the protective film;

The object may be reproduced by photographic printing techniques. However the photographic reproduction is preferably produced by using a laser colour photocopier such as the Canon CLC 500 as this method permits each simulated gem to be different and therefore unique.

The backing sheet may comprise any suitable material such as paper, synthetic paper, film or holographic foil. Preferably the backing sheet comprises a clear film suitable for use on a colour laser photocopy machine.

In the absence of the clear protective film toners used in producing the photocopy of the object tend to dissolve in the thermosetting resin especially if it is warmed when it is cured. In addition, if the backing sheet is paper, the paper absorbs the thermosetting resin and discolours or becomes opaque and enables the colour of the support mould to show through especially if the base of the support mould is black. Consequently the main function of the protective film is to prevent dissolution of toner into the thermosetting resin. A secondary function of the film is to prevent discolouration of the backing sheet especially is an absorbent material has been used as the backing sheet.

Preferably the clear protective film is a polyester film such as polyethylene terephthalate.

In a preferred form of the invention, a copy of the object is photocopies onto a clear film, the clear film is laminated to a backing sheet of holographic foil and a front sheet of clear film.

The invention also provides an alternative method of making the articles of the invention, the alternative method comprises photographically reproducing an object onto a suitable substrate using a material to define an image of the object that is capable of being removed from the substrate by a preset thermosetting resin, applying a clear preset thermosetting resin to the photographic reproduction on the substrate or applying the surface of the substrate bearing the photographic reproduction thereon to a preset thermosetting resin, causing the material to migrate from the substrate to the thermosetting resin and removing the substrate.

Holographic foil or a sheet of another suitable backing material may be applied to the surface of the thermosetting resin from which the substrate was removed.

Preferably the clear preset thermosetting resin is heated or placed in a vacuum cabinet prior to curing in order to remove air bubbles therefrom.

The object may be reproduced by photographic printing techniques. However the photographic reproduction is preferably produced by using a laser colour photocopier such as the Canon CLC 500. In this case a photographic reproduction of the object is produced by application of a toner to a suitable sheet of material such as paper or polyester film. The preset thermosetting resin is then applied to the photographic reproduction, the sheet and the applied thermosetting resin are heated or placed in a vacuum cabinet to remove air from the resin, the resin is cured and the sheet is removed leaving the toner embedded in the thermosetting resin still in the form of the reproduction of the object. A suitable clear thermosetting resin is epoxy 303 obtainable from British United Industries.

Alternatively the resin may be poured onto a backing sheet. A photocopy of the object on a suitable sheet of material is then applied to the preset resin. The sandwich formed by the resin and the two sheets is then rolled or placed in a vacuum frame to remove all air from the resin, the resin is cured and the photocopy sheet is removed leaving the toner in the form of the reproduction of the object embedded in the surface of the resin.

A further time saving method of manufacturing the simulated objects of the present invention is to injection mould a holographic pattern onto a surface of a thermoplastics material. In order to do this a holographic grating is made in the conventional way from images generated to a specific pattern. From the original glass plate a nickel shim is then grown by means of the conventional electroplating technique to a thickness of 1.6 mm or more for ease of handling. The nickel shim is cut to shape and fitted into a metal housing which becomes part of an injection moulding dye. Molten thermoplastics material is injected into the dye and the pressure is maintained to minimise shrinkage until the thermoplastics material has cooled sufficiently to be ejected from the dye. It is possible to adhere a thin shim to the face of a dye but because of the pressures inside the mould, the shim is soon pushed from the surface. Therefore, it is desirable to use a shim having a greater thickness than those used for conventional roller reproduction of holographic patterns. In order to protect the holograph applied to the surface of the article, it is desirable to cover that surface with a backing which may be adhered to the article by means of ultrasonic welding or by some other technique.

The process may be used on opaque, translucent or transparent materials of any colour. The holographic patterns or images used may take any form and are not restricted to any particular form. Images may also be applied to thermoplastics articles by the same process. These may include images of popular cartoon characters, promotional images, scenes, letters, etc.

This process will permit holographic patterns to be directly moulded onto watch and clock faces or covers, reflectors, fairy light covers, christmas tree decorations, promotional products, etc.

The surface to which the holographic pattern has been applied may be metallised.

In order to enhance the effect of the holographic pattern, the original film used to produce the nickel shim is double micro-embossed. The double micro-embossing is achieved by shooting a second image onto the original plate at right angles to the first image. The resultant holograph has a wider range of visibility as a result of this double micro-embossing technique.

The method may be used to produce simulated stained glass windows, club badges and simulated gem stones as well as many other similar reproductions.

Since modifications within the spirit and scope of the invention may readily be effected by persons skilled within the art, it is to be understood that this invention is not limited to the particular embodiments described by way of example.

An embodiment of the invention will now be described with reference to the accompanying drawings in which.

Figure 3:
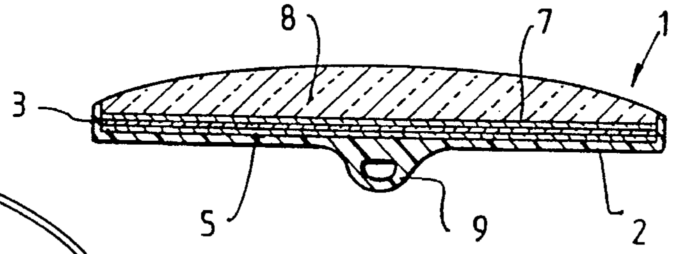
Figure 4A:
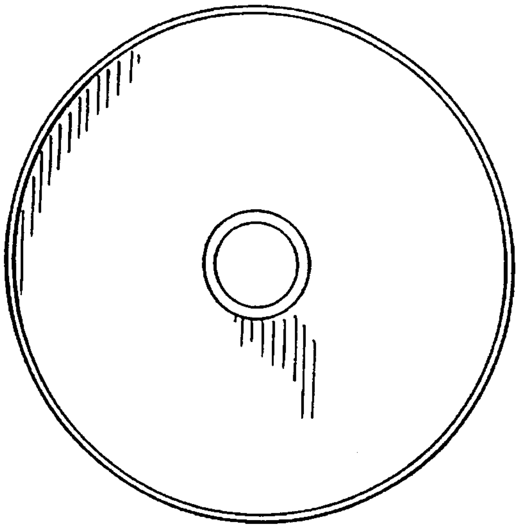
Figure 4B:
Figure 5:
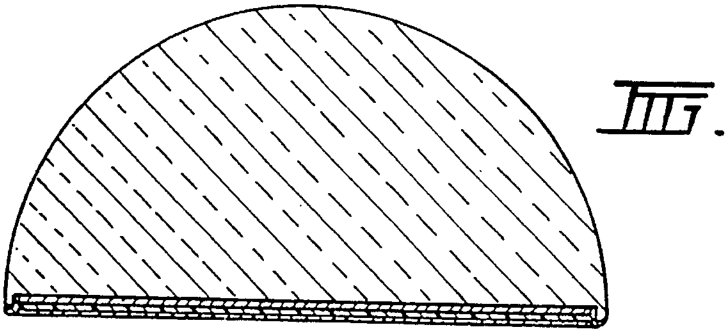
Figure 6A:
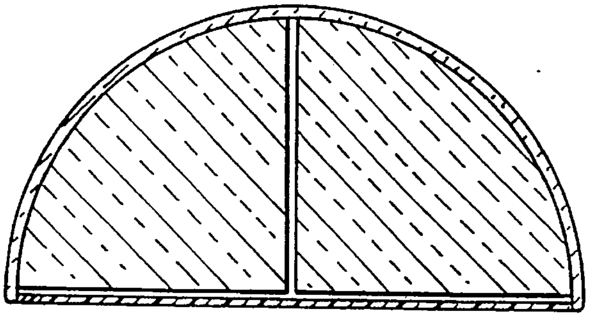
Figure 6C:
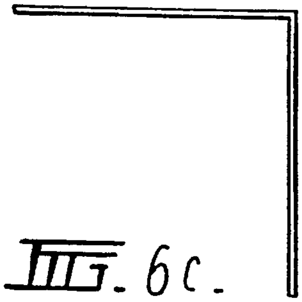
Figure 6B:
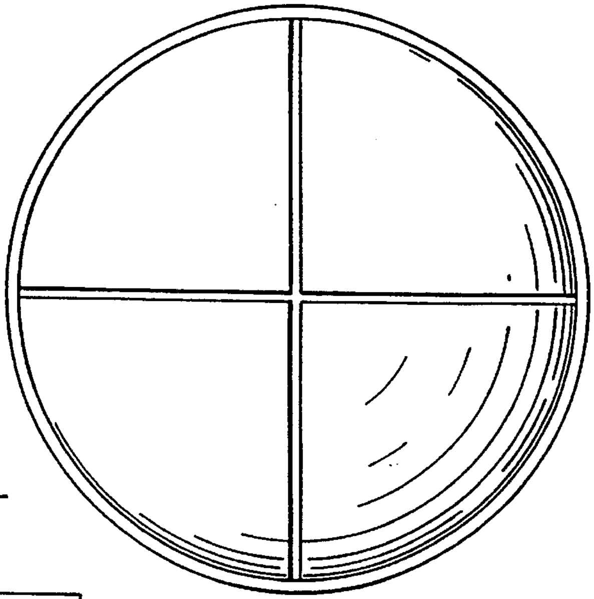

FIG. 3 represents a cross-sectional view of another form of button produced according to the invention; FIG. 4A represents a plan view of a bottom having a central hole for containing a decorative insert; FIG. 4B is a cross sectional view of the button depicted in FIG. 4A;

FIG. 5 is a cross sectional view of half a bead;

FIG. 6A is a cross sectional view of half of another bead;

FIG. 6B is a cross sectional view of the whole bead;

FIG. 6C depicts an insert prior to folding; and

Figure 6D:
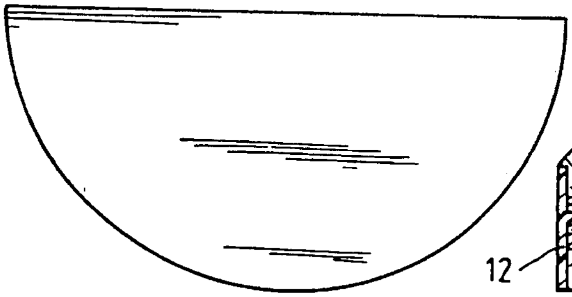

FIG. 6D depicts a folded insert; and

Figure 7:
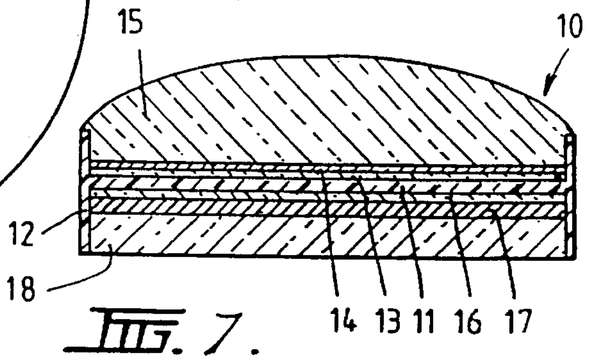

FIG. 7 is a cross sectional view of an article made according to the invention.

Figure 1:
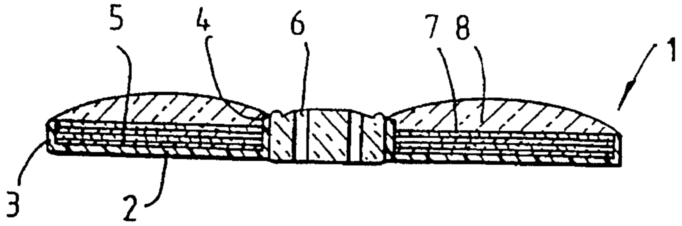
FIG. 1 represents an elevation in cross-section of a button produced according to the invention.
Figure 2:
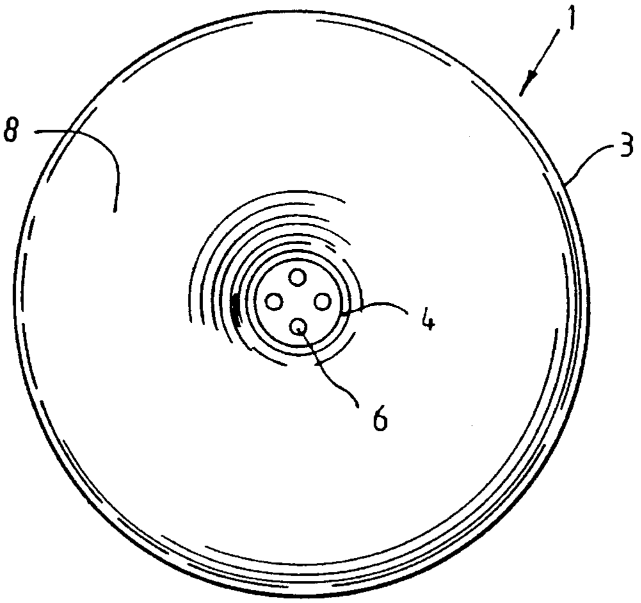
FIG. 2 represents a plan view of a button produced according to the invention.

FIG. 1 illustrates a button mould 1 comprising a circular backing plate 2 having a peripheral flange 3 and a concentrically arranged flange 4 having a substantially smaller diameter than that of the peripheral flange 3 to define annulus 5 therebetween. The portion of the backing plate 2 lying within the boundaries of the flange 4 has button holes 6 passing therethrough.

A black opal is cut and polished to produce a surface that is capable of being photocopied, the surface is photocopied onto a clear film using a Canon CLC 500 laser colour photocopier. Alternatively the gem is immersed in glycerine or another sealable liquid and a photocopy taken whilst the gem is immersed. The photocopy is then laminated between a backing sheet of holographic foil and a front sheet of clear film. The laminate is cut to size and inserted into the bottom of the annulus as defined by the flanges 3 and 4 with the holographic film placed against the plate 2 and the clear film facing outwardly to form photographic reproduction 7. A thermosetting resin 8 is poured into the mould and cured.

FIG. 3 illustrates an alternative button in which the button holes have been replaced by a shank 9.

Instead of using a backing plate having a peripheral flange it is possible to use a clear moulded dome shaped sheet of acrylic plastics material having a peripheral flange. The dome is placed upside down on a flat surface and a clear thermosetting resin is applied to the inside of the dome shaped sheet. The two dimensional reproduction is placed inside the dome all air bubbles are removed from between the surfaces and additional thermosetting resin is applied to the rear surface of the two dimensional reproduction. In the case of a simulated opal the two dimensional reproduction is on a transparency and a holographic material is placed on the back of the second layer of the thermosetting resin. Again air bubbles are removed from between the holographic material and the resin. In the case of simulated gem stones, a white resin is applied to the rear of the transparency and the mould is filled to the top of the flange with the white thermosetting resin.

In the case of an opal, a black thermosetting resin is applied to the rear of the transparency carrying the two dimensional reproduction. A further alternative to the use of a backing plate having a peripheral flange is the use of a moulding having an H-shaped cross-section as depicted in FIG. 7. FIG. 7 illustrates a moulding 10 having a centrepiece 11 and peripheral flange 12 defining the sides of the moulding. The centrepiece 11 is made of a clear plastics material. A layer 13 of clear thermosetting resin is placed on top of the centrepiece 11. A two dimensional representation on a sheet of transparent film 14 is placed on top of the layer of clear thermosetting resin and an additional layer 15 of clear thermosetting resin is placed on top of the transparency, allowed to form a natural meniscus and the various layers of resin are cured. The moulding 10 is then turned around the other way with the domed thermoset resin 15 facing downwardly. A layer of clear thermosetting resin 16 is poured onto the centrepiece 11. A sheet of holographic foil 17 is placed on the surface of the thermosetting resin and a layer 18 of an opaque thermosetting resin is poured onto the sheet of holographic foil 17. The various layers of thermosetting resin forming the underside of the article are then cured to produce the final article.

In another method the transparency may be cut to the shape of a setting and thermosetting resin applied to the resulting shape. The thermosetting resin flows to the edges of the shape and hold a meniscus. When the resin has set the transparency is removed leaving the toners defining the image embedded in the resin. A holographic material is applied to the surface of the resin from which the transparency was removed. In the case of gem stones a coloured material preferably white is adhered to the back. In another instance the holographic material or a white material may be applied directly to a jewellery or other setting and the domed thermosetting resin part containing the removed toner is stuck onto the adhered material.

In another method holographic material or white material in the case of gem stones may be adhered to the toner surface of a photocopier on transparent film and then cut to a desired shape and size. The resulting laminate is then placed with the film side up and thermosetting resin is poured to form a meniscus. When set the article is placed into a setting. Alternatively the laminate may be placed directly into a setting with a peripheral lip and epoxy resin poured to form a meniscus.

The invention has many potential uses. For example a service may be offered to owners of high quality gemstones to produce simulations of the gemstones without destroying the original. Many collectors or dealers would be able to obtain replicas of such gemstones to enhance their displays for advertising their wares. The gems may be produced in actual size or may be enlarged for high visual impact displays in museums and educational facilities. Collectors could purchase replicas of famous gemstones.

The product is versatile. Specific patterns may be applied to holographic material, say in the form of the lines depicting a faceted stone. In this way simulated faceted gemstones would be created.

Beads are another option. They could be made using a pair of high domed injection moulded acrylic parts 20 of any shape but for convenience the parts are desirably hemispherical as depicted in FIG. 5. Round beads require two moulded hemispherical sections 20 each with a peripheral lip 24 surrounding a recessed back 21, designed to take an insert 22 comprising the two dimensional reproduction. Resin is then applied to the back of the hemisphere and the insert put in place, face down, taking care to eliminate air from between the insert and the back (the back becomes the centre of the bead. The two similar bead sections could then be stuck together, using a glue, solvent welding or ultrasonic welding and drilled, or assembled by other means around a string or around a metal assembly hook. Simulated opal and gemstone beads may be mass produced at low cost.

The hemispheres may be made with two slits 25 moulded at right angles within the described part (as depicted in FIGS. 6A and 6B) to allow two folded inserts 26 to be placed within the moulded parts and a resin applied to the top edge of the slits once the inserts are in place. Beads would be set up in rows, on racks, and placed in a vacuum chamber to remove all air. Six separate inserts are necessary to create a 3-D image within the bead giving the appearance that the bead is a solid ball. The two halves are then honed as described.

Using the function of the Canon Laser Copier or other similar colour copier in conjunction with the Apple Mac/Quark graphics or other suitable colour graphic system it is possible and also feasible to create mosaic or intarsia gem or opal pictures. Opal textures may be painted by an artist, say, for example, a koala, which incorporates colour and textures of opal depicting outstanding features of the animal, or other subject material, which is then "inlaid", or actually overlaid, onto a different textured opal backing to give the effect that the koala, or other subject, is naturally occurring in the opal. Initials, company logos or other graphics may also be created in contrasting opal colours and textures and overlaid, via the computer, onto an opal, or other gemstone, backing.

The benefit of this function is the low cost of setting up for short run productions of promotional materials for clubs, companies and other fund raising enterprises. A further special effect may be created by using a cabochoned acrylic (perspex), or other, top, flat on the back but engraved with the desired picture, initial, logo etc., to give a three-dimensional effect of the art within the gem. Another effect may also be created by adding a small amount of black or grey dye to the resin, especially with black opal, to more closely simulate the real gem.

White opal may also be simulated but the process would be entirely different as the laser copier will not reproduce the colour white. White is the base colour and therefore these products must be reproduced by a printing or screen printing method. A simulated white opal may be produced by laminating holographic foil and cutting out an insert to the desired shape and size, then embossing a pattern into the laminations. The embossed insert is then placed in the backing member and a resin top is formed as previously described. The embossed pattern would closely resemble the naturally occurring patterns of white opal. The best effect of the embossing process would be achieved if cross ruled holographic material is used. The reason for this is that the embossing process puts a relief structure on the surface of the holographic material diverting rays of diffraction light, at various angles, from the distorted surface of the laminated holographic insert.

Each method has advantages over the other and the product will be manufactured by the various methods to cater for different market requirements. There are distinguishing differences between each of the manufacturing methods. The advantage of using the preformed domed sheet of plastics material is that it produces a better looking product which has consistent dimensions and may therefore be set in claw-type settings. Although more costly to manufacture the product more closely resembles the genuine article. The other methods have a price advantage as they are quicker to manufacture. Whilst it is possible to use any particular diffraction grating or holographic material to produce the same effect, it is desirable to have a specific hologram designed and made to certain specifications.

It is also possible to manufacture the product prior to embossing the holographic grating onto a transparency or printed clear film therefore lowering the cost of production. In this application the transparency is made and embossed with the hologram. Later a metallic backing is applied to the material either by vacuum plating, adhering or laminating.

Printing onto the holographic material would save a great deal of time and money. Printing on the film may be done before or after embossing the hologram and then covered on one side with a metallic reflective coating. An opal pattern may also be printed directly onto holographic reflective material again lowering manufacturing costs. The materials generally used in holographic foils are of the polyester/mylar type but any material that may be heated without melting or distortion may be embossed with a grating.

The hologram may also be used without a reflective backing and the holographic film may be coloured or clear. The process involves laying one or more layers of holographic material on a support and embedding them in a thermosetting resin similar to the above methods. It is also possible to engrave a holographic material in such a way that is looks like an opal without the necessity of photographically reproducing a surface of the opal.

There are a number of other methods of forming articles according to the invention.

One method comprises pouring a small amount of resin into an inverted clear plastics dome and then laying a clear piece of holographic material (no reflective backing) within the retaining peripheral lip removing all air from between the surfaces. The second step is to either repeat the first step one or more times and then pour a clear resin back, making the gem "see-through". A second alternative is to place a transparency, with the desired pattern behind or between these clear layers and then pour the final stage giving the effect that the gem is solid. A third possibility is to place a reflective backing or reflective holographic foil behind the transparency and then pour an opaque backing. The backing may also be left with the holographic foil in view. Another possibility applies to the method of manufacturing the product using backing members. This method requires the placement of a reflective backing into the base of the backing member with the peripheral lip using resin and each time removing all air, and finally placing one or more layers of clear thermosetting resin to form a meniscus. Another possibility, using the backing member, as previously described is to use colour reproductions (photocopies, prints, photographs, paintings etc.) of the desired patterns in place of the transparency and overlay the clear holographic materials or, in the case of manufacturing the product in the domes, place the colour reproduction of the desired pattern behind the layer, or layers, of clear holographic material.

What is claimed is:

1. An article comprising a two dimensional reproduction of a surface of an object on a sheet of transparent material, a reflective backing, and a protective coating of a clear resin or clear plastics material for protecting the sheet of transparent material; the reflective backing, the protective coating and the sheet of transparent material being so arranged that the two dimensional reproduction has a three dimensional appearance.

2. The article according to claim 1 wherein the two dimensional reproduction is a photographic reproduction.

3. The article according to claim 1 wherein the two dimensional reproduction is a drawn simulation on a diffraction grating that simulates a surface of the object when light passes through the protective coating and is diffracted and reflected by the diffraction grating.

4. The article according to claim 1 wherein the protective coating is a clear thermosetting resin.

5. The article according to claim 4 wherein the clear thermosetting resin is a epoxy resin.

6. The article according to claim 1 wherein the protective coating is a poly(meth)acrylate.

7. The article according to claim 1 wherein the article is a button.

8. The article according to claim 1 wherein the object is a gemstone.

9. The article according to claim 8 wherein the gemstone is an opal.

10. An article comprising a two dimensional reproduction of a surface of an object on a sheet of suitable material with a reflective backing and a protective coating of a clear resin of clear plastics material, the protecting coating being formed with a convex external surface so that the two dimensional reproduction has three dimensional appearance thereby creating an image of the object.

11. The article according to claim 10, wherein the two dimensional reproduction is a photographic reproduction.

12. The article according to claim 10 wherein the two dimensional reproduction is a drawn simulation on a diffraction grating that simulates a surface of the object when light passes through the protective coating and is diffracted and reflected by the diffraction grating.

13. The article according to claim 10 wherein the protective coating is a clear thermosetting resin.

14. The article according to claim 13 wherein the clear thermosetting resin is an epoxy resin.

15. The article according to claim 10 wherein the protective coating is a poly(meth)acrylate.

16. The article according to claim 10 wherein the article is a button.

17. The article according to claim 10 wherein the object is a gemstone.

18. The article according to claim 17 wherein the gemstone is an opal.

19. A method of making an article according to claim 10 which method comprises forming a two dimensional representation of a surface of an object, providing a reflective backing and covering the two dimensional representation with a protective coating of a clear resin or clear plastics material having a convex external surface so that the protective coating causes the two dimensional reproduction to have a three dimensional appearance.

20. The method according to claim 19 wherein the two dimensional representation is a photocopy produced on a suitable sheet of material by a laser colour photocopier.

21. The method according to claim 20 wherein the material is selected from the group consisting of paper, holographic foil and polyethyleneterephthalate.

22. The method according to claim 20 including the step of covering the photocopy with a protective film before applying a thermosetting resin when the protective coating is a thermosetting resin.

23. The method according to claim 19 wherein the protective coating is a thermosetting resin and the method includes the steps of warming the thermosetting resin to reduce its viscosity, applying the thermosetting resin after warming to the two dimensional representation, allowing the thermosetting resin to form a natural meniscus on its external surface and curing the thermosetting resin.

24. The method according to claim 19 wherein the thermosetting resin is an epoxy resin.

25. The method according to claim 19 wherein the protective coating is a preformed sheet of a clear plastics material.

26. The method according to claim 25 wherein the plastics material is a poly(meth)acrylate.

27. The method according to claim 25 wherein the two dimensional representation is placed inside the preformed sheet of clear plastics material, a thermosetting resin is applied to a rear side of the two dimensional representation and the thermosetting resin is cured.

28. The method according claim 25 which includes the step of applying a clear thermosetting resin to an inside surface of the preformed sheet of the clear plastics material before placing the two dimensional representation inside the preformed sheet.

29. A method of manufacturing an article according to claim 10 which method comprises photographically reproducing an object onto a suitable substrate using a material that is capable of being removed from the substrate by a preset thermosetting resin, applying a clear preset thermosetting resin to the photographic reproduction on the substrate or applying the surface of the substrate bearing the photographic reproduction thereon to a preset thermosetting resin, causing the material to migrate from the substrate to the thermosetting resin and removing the substrate.

* * * * *